United States Patent
Lee et al.

(10) Patent No.: US 8,903,397 B2
(45) Date of Patent: Dec. 2, 2014

(54) NEIGHBOR CELL LIST AUTOMATIC CONFIGURATION APPARATUS AND METHOD FOR SELF-ORGANIZING NETWORK AND MOBILE TELECOMMUNICATION SYSTEM FOR THE SAME

(75) Inventors: Jung Seung Lee, Uiwang-si (KR); Byoung Seong Park, Incheon (KR)

(73) Assignee: LG-Ericsson Co., Ltd., Seoul (KR)

( * ) Notice: Subject to any disclaimer, the term of this patent is extended or adjusted under 35 U.S.C. 154(b) by 336 days.

(21) Appl. No.: 13/420,750

(22) Filed: Mar. 15, 2012

(65) Prior Publication Data
US 2013/0244718 A1    Sep. 19, 2013

(51) Int. Cl.
*H04W 36/00*    (2009.01)

(52) U.S. Cl.
USPC ......... 455/436; 455/440; 455/525; 455/67.11

(58) Field of Classification Search
CPC ...................... H04W 36/0083; H04W 36/0061
USPC ......... 455/436, 439, 440, 442, 434, 515, 446, 455/444, 443, 525, 67.11, 67.13, 501, 500
See application file for complete search history.

(56) References Cited

U.S. PATENT DOCUMENTS

| | | | |
|---|---|---|---|
| 2003/0095516 A1* | 5/2003 | Ok et al. | 370/331 |
| 2005/0043046 A1* | 2/2005 | Lee | 455/502 |
| 2005/0288017 A1* | 12/2005 | Doumenc et al. | 455/435.3 |
| 2009/0047961 A1* | 2/2009 | Kim | 455/436 |

* cited by examiner

Primary Examiner — John J Lee
(74) Attorney, Agent, or Firm — Ked & Associates, LLP

(57) ABSTRACT

Provided are a Neighbor Cell List (NCL) automatic configuration apparatus and method for implementing Self-organizing Network (SON) and a mobile communication system for the same. The NCL automatic configuration apparatus and method collect at least one of neighbor cell information including cell searching information necessary for a handover of a user equipment to a neighbor cell and distance information between a corresponding base station and a neighbor cell. An NCL generator calculates weightings of neighbor base stations, calculates sum of the weightings and configures an NCL with base stations having higher weightings, on the basis of the at least one neighbor cell information.

17 Claims, 5 Drawing Sheets

FIG. 3

| Detected Cell | PhyCell ID | Weighting | PhyCell ID | Weighting | PhyCell ID | Weighting |
|---|---|---|---|---|---|---|
| NCL | 0 | 50 | 5 | 30 | 10 | 20 |
| | 1 | 25 | 0 | 15 | 0 | 10 |
| | 2 | 25 | 1 | 15 | 3 | 10 |
| | 5 | 25 | 3 | 15 | 8 | 10 |
| | 7 | 25 | 4 | 15 | 9 | 10 |
| | 8 | 25 | 5 | 15 | 11 | 10 |
| | 10 | 25 | 18 | 15 | 12 | 10 |

| PhyCell ID | 0 | 5 | 10 | 1 | 7 | 8 | 2 | 3 | 4 | 18 | 15 | 9 | 10 | 11 | 12 |
|---|---|---|---|---|---|---|---|---|---|---|---|---|---|---|---|
| SUM OF WEIGHTINGS | 75 | 55 | 45 | 40 | 40 | 35 | 25 | 25 | 15 | 15 | 15 | 10 | 10 | 10 | 10 |

NEIGHBOR CELL LIST AUTOMATIC CONFIGURATION APPARATUS AND METHOD FOR SELF-ORGANIZING NETWORK AND MOBILE TELECOMMUNICATION SYSTEM FOR THE SAME

TECHNICAL FIELD

The present disclosure relates to a mobile communication technology field, and particularly, to a Neighbor Cell List (NCL) automatic configuration apparatus and method for implementing Self-organizing Network (SON) and a mobile communication system for the same.

BACKGROUND

With rapid developments in communications, computer networks and semiconductor technologies, a variety of services are provided using wireless communication networks. Not only that, users are requiring higher-level services and wireless internet service market around the world is growing explosively. To accommodate these trends, a mobile communication system using a wireless communication network is being evolved to provide a multimedia communication service transmitting various data in addition to a voice service.

Recently, wireless data services through code division multiple access (CDMA) 2000, evolution data only (EV-DO), wideband CDMA (WCDMA) and wireless local area networks (WLANs) have been commercialized. Thus, the residential use of mobile phones and the demand for mobile data at home have increased steadily. To keep up with such trend, a method for providing mobile communication services by installing a small cell base station indoors has been proposed so as to access a core network of the mobile communication system through an indoor broadband network. Particularly in a next-generation network system, a method of disposing a number of small size cells (e.g., femto-cells) has been proposed to meet the demand for a high data transmission rate and facilitate stable and reliable providing of various services. A small cell base station covering such small size cells may otherwise be referred to as an indoor base station or a femto base station and a Home-eNB, a HeNB or the like in the 3rd Generation Partnership Project (3GPP). As such, by reducing the size of the cell to be served in an indoor environment, efficiency of the next-generation network system using a high frequency band can be improved. Further, using a number of small size cells is advantageous in that the number of times of frequency reuse can be increased. Also, such a small size multiple cell using scheme offers an advantage of improving the deteriorated channel status due to radio wave attenuation which is caused by controlling the entire cell area with only one base station. The scheme also offers the advantage of enabling services to a user in a shadow area, which used to be impossible. Based on these advantages, a scheme of combining a conventional macro-cell (a cell area controlled by an outdoor base station) and a femto-cell (a cell area controlled by a small cell base station such as an indoor base station, a femto base station and the like) is newly devised and is drawing attention.

The above-described cell combining scheme has advantage in light of the provision of service. Such a scheme, however, has disadvantage in that it requires a larger number of base stations to provide high quality data service in the same area to thereby increase costs in installation and operation of the base stations. In particular, a lot of labor and time are required to determine a parameter in relation with radio or cable characteristics. Further, merely with a centralized management, it is difficult to efficiently cope with constant environmental changes. Furthermore, when changes are made, a redefinition with respect to the whole system should be given. Thus, it is not easy to detect optimum conditions with respect to a variable location of the base station (that is, the small cell base station is installed by a user where he/she wants, not at the optimum location designated by a service provider) and constantly changing wireless environments. These circumstances necessitate devising a self-organizing network (SON) designed to adapt to the wireless environments, where the base stations and networks are randomly installed and also automatically change, and data traffic environments. For implementation of the SON, measurement of wireless information and surrounding network information are needed. Accurate and abundant input information facilitates implementation of effective SON algorithm.

Ordinarily, installation of a base station accompanies the following procedures: to obtain the location of the base station, estimate radio wave propagation environments, then predict neighbor cells to which a user equipment can perform a handover, and thereby make a neighbor cell list (NCL). The NCL broadcasted by the base station refers to information which indicates configurations of the neighbor cells when the user equipment serviced by the serving base station performs the handover to one of the neighbor cells. The base station broadcasts the NCL and the user equipment to perform the handover to another cell performs neighbor cell search by using the broadcasted NCL.

As described above, to cope with the mobile communications market trend that requires small cell coverage, a larger number of base stations are necessary to provide high quality data services in the same area. Installation and maintenance of a large number of base stations entails enormous costs for network installation and maintenance. Under these conditions, it is difficult to manually set an NCL every time in installing a base station, in terms of management and operation. Furthermore, in small cell base stations such as indoor base stations and femto base stations, it is expected to install larger number of the base stations, and it is required to allow the on/off of the base stations to become free and secure the mobility of the base stations. Therefore, in manually configuring an NCL, there is a difficulty in network management as well as cost.

Accordingly, when a base station is installed indoors or outdoors, the function of SON that allows the base station to autonomously access or set a network and appropriately performs cell optimization and management according to an ambient wireless environment is acutely required. A network provider can automatically manage and operate a manually controlled network over the SON.

SUMMARY

The present disclosure provides some embodiments of an NCL automatic configuration apparatus and method for implementing SON and a mobile communication system for the same.

According to an aspect of the present disclosure, disclosed are an NCL automatic configuration apparatus and method for implementing SON and a mobile communication system for the same. The apparatus and method collect at least one of neighbor cell information including cell searching information necessary for a handover of a user equipment to a neighbor cell and distance information between a corresponding base station and a neighbor cell calculate the weightings of neighbor base stations, calculate the sum of the weightings, and configure an NCL with base stations having a high weight, on the basis of the at least one neighbor cell information. The NCL, which has been configured in this way, is broadcasted through a base station apparatus for searching neighbor cells.

BRIEF DESCRIPTION OF THE DRAWINGS

FIG. 3 is a diagram showing a procedure of setting and calculating neighbor base station weightings for Neighbor Cell List (NCL) configuration according to an embodiment of the present invention.

DETAILED DESCRIPTION

Hereinafter, embodiments of the present disclosure will be described in detail with reference to the accompanying drawings. However, detailed descriptions related to well-known functions or configurations will be ruled out in order not to unnecessarily obscure subject matters of the present disclosure.

Figure 1:
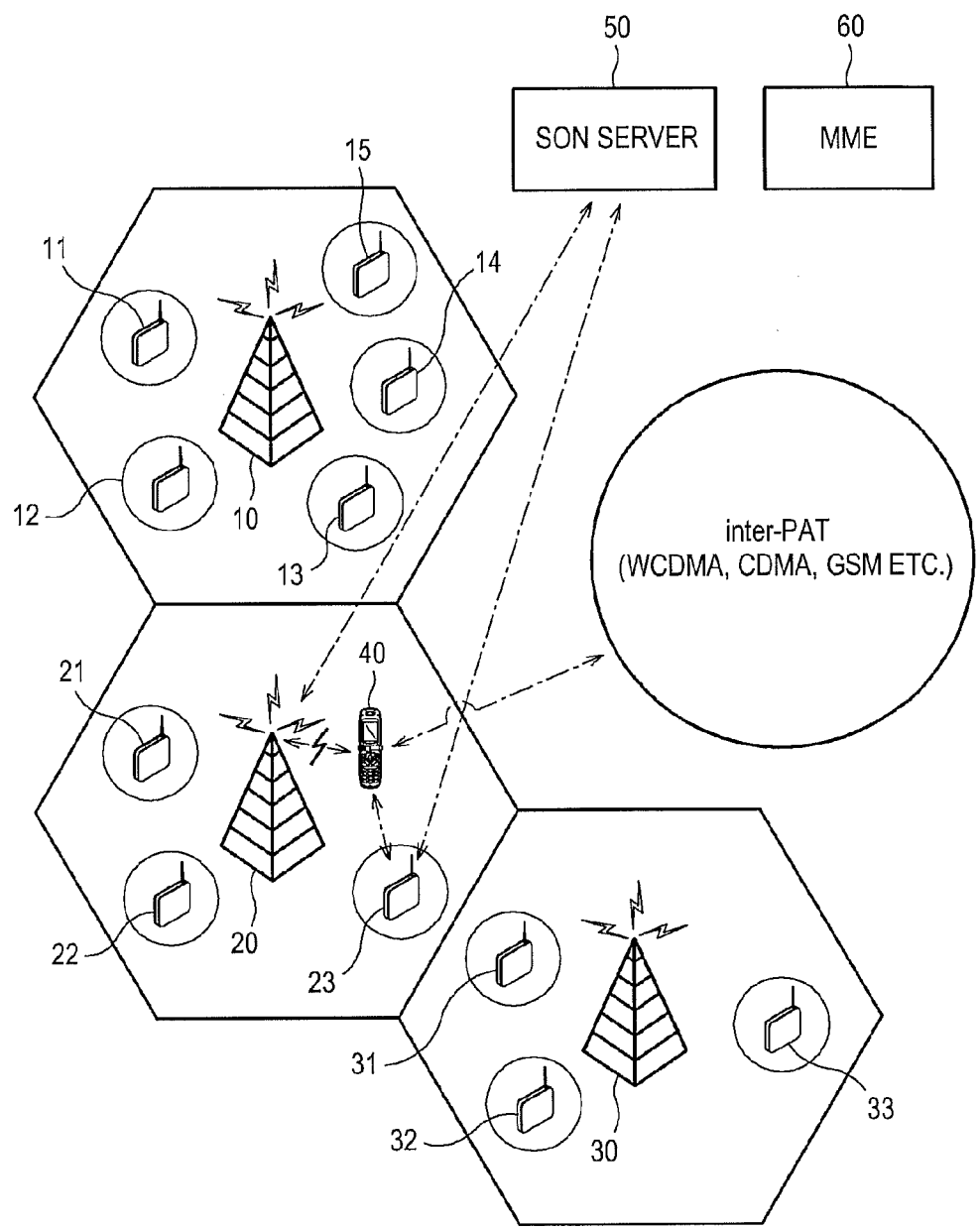
FIG. 1 is a diagram illustrating an exemplary embodiment of a mobile communication network according to the present invention.

FIG. 1 is a diagram illustrating an exemplary embodiment of a mobile communication network according to the present invention.

In an embodiment, for example, the mobile communication network may include Global System for Mobile communication (GSM) network, 2G mobile communication network such as CDMA, LTE network, wireless Internet such as WiFi, portable Internet such as Wireless Broadband Internet (WiBro) and World Interoperability for Microwave Access (WiMax), a mobile communication network (e.g., 3G mobile communication network such as WCDMA or CDMA2000, 3.5G mobile communication network such as High Speed Downlink Packet Access (HSDPA) or High Speed Uplink Packet Access (HSUPA), or 4G mobile communication network that is currently providing service, or the like) that supports the transmission of a packet and other arbitrary mobile communication networks that include a macro base station (Macro-eNB), a small cell base station (femto-cell or HeNB (Home-eNB)), and User Equipment (UE), but the mobile communication network may not be limited thereto. Hereinafter, on the embodiment will be described mainly in the context of E-UTRAN that is the LTE wireless access network.

As illustrated in FIG. 1, the mobile communication network may be configured with one or more network cells, and different network cells may be included in the mobile communication network. The mobile communication network may include a plurality of small cell base stations (Home-eNB) 11 to 15, 21 to 23 and 31 to 33, which manage small network cells (for example, femto-cells, etc.), a plurality of macro base stations (Macro-eNB or eNB) 10, 20 and 30, which manage wide range cells (for example, macro-cells, etc.), user equipment (UE) 40, a Self Organizing & optimizing Networks (SON) server 50, a Mobility Management Entity (MME) 60, a Serving Gateway (S-GW) 80, and a PDN Gateway (P-GW) 90. The number of elements illustrated in FIG. 1 is exemplary, and the number of elements of the mobile communication network for implementing the present invention may not be limited thereto.

The macro base stations (Macro-eNB or eNB) 10, 20 and 30, for example, may include a feature of a macro-cell base station that manages a cell having a radius of about 1 km, which may be allowed to be used in LTE network, WiFi network, WiBro network, WiMax network, WCDMA network, CDMA network, UMTS network, and GSM network, but the present embodiment is not limited thereto.

The small cell base stations (Home-eNB) 11 to 15, 21 to 23 and 31 to 33, may include the features of an indoor base station and a femto base station that manage, for example, a cell having a radius of several tens meters, which are allowed to be used, for example, in LTE network, WiFi network, WiBro network, WiMax network, WCDMA network, CDMA network, UMTS network, and GSM network, but the small cell base station may not be limited thereto.

The small cell base stations 11 to 15, 21 to 23 and 31 to 33 and the macro base stations 10, 20 and 30 may have independent connectivity to a core network, respectively.

The UE 40 may have features of a wireless mobile terminal used in a 2G mobile communication network such as a GSM network and a CDMA network, a wireless internet network such as a LTE network and a WiFi network, a portable internet network such as a WiBro network and a WiMax network and a mobile communication network supporting packet transport. However, the UE 40 may not be limited thereto.

A operation and management (O&M) server 70, which is a network management apparatus of the small cell base station, is configured to perform management of the small cell base stations 11 to 15, 21 to 23 and 31 to 33 and the macro base stations (Macro-eNB or eNB) 10, 20 and 30 and configuration information thereof. The O&M server 70 may perform functions of both the SON server 50 and the MME 60. The SON server 50 may includes an arbitrary server, which may perform installation and optimization of the macro base station and the small cell base station and function to provide basic parameters or data necessary for the respective base stations. The MME 60 may include an arbitrary entity for managing the mobility of the UE 40. Also, each of MMEs 61 and 62 may perform a function of a Base Station Controller (BSC), and perform resource allocation, call control, handover control, audio processing, and packet processing for a base station (pico eNB, HeNB, macro eNB, etc.) connected thereto.

In an embodiment, the one network management server 70 may perform the function of the SON server 50 and the function of the MME 60. The SON server 50 and the MME 60 may be configured to manage one or more macro base stations 10, 20 and 30 and one or more small cell base stations 11 to 15, 21 to 23 and 31 to 33.

Although it is assumed that the network cells are in a mixed form of the macro cells and femto cells in the above mobile communication network, it may be possible that the network cells are configured only with either the macro cells or the femto cells.

Assuming that the above-described mobile communication network is a LTE network, the LTE network may interwork with inter-RAT networks (e.g., WiFi network, WiBro network, WiMax network, WCDMA network, CDMA network, UMTS network, GSM network and the like). When one of the inter-RAT networks is the mobile communication network, the mobile communication network may also interwork with the other networks (LTE network, WiFi network, WiBro network, WiMax network, WCDMA network, CDMA network, UMTS network, GSM network and the like). Although one of the networks (for example, LTE network) is illustrated as being separated from the other networks (LTE network, WiFi network, WiBro network, WiMax network, WCDMA network, CDMA network, UMTS network, GSM network and the like) in the drawing, the present embodiment is based on the premise that one type of network and the other types of networks are overlaid with each other.

An NCL, which is broadcasted by the macro base stations 10, 20 and 30 and the small cell base stations 11 to 15, 21 to 23 and 31 to 33, notifies how the neighbor cells are configured at the time that the user equipment 40, which is receiving the service from a current base station, performs handover to the neighbor cell (macro cell or femto cell). For example, in the LTE network, the NCL notifies a Physical Cell Identity (PCI), which is used by neighbor cells, among 504 PCIs to the user equipment 40 to thereby allow the user equipment 40 to efficiently perform cell searching for handover. NCL information is divided into an intra-frequency NCL (where of the neighbor cells use the same frequency), an inter-frequency NCL (where the neighbor cells use different frequencies), and an inter-RAT NCL (where the neighbor cells are respectively under different communication protocols from each other). The user equipment 40 searches a plurality of neighbor cells on the basis of the NCL information to perform handover to a neighbor macro-cell or a femto-cell.

In LTE network, an access to the macro-cell is allowed to all user equipments, but an access to a femto-cell may be allowed for limited specific user equipments (subscribers). Hereinafter, an access procedure of the user equipment 40 will be described based on a small cell base station 21. The access procedure may be identically applied to the small cell base stations 11 to 15, 21 to 23 and 31 to 33 having the same configuration as that of the small cell base station 21.

The small cell base station 21 may broadcast a System Information Block type 1 (SIB 1) that is information on a femto-cell which is managed by itself, wherein the SIB 1 includes a Closed Subscriber Group (CSG) indicator that indicates whether an access to a corresponding femto-cell is restricted. When the CSG indicator in the SIB 1 broadcasted by the small cell base station 21 has a true value, a communication is performed in a closed type that allows only a specific subscriber to access a corresponding femto-cell (CSG), but when the CSG indicator has a false value, a communication is performed in an open type that allows all subscribers to access the corresponding femto-cell (OSG). When the CSG indicator has a true value, the user equipment 40 may check whether the femto-cell is included in a white list, which is a list of femto cells accessible to the user equipment 40, and access a corresponding femto-cell, only if it is confirmed that the corresponding femto-cell is included.

For example, the user equipment 40 may figure out whether an access to a corresponding femto-cell is restricted, on the basis of a CSG indicator of the SIB 1 that is broadcasted by the small cell base station 21. Also, as the identities for the user equipment 40 to identify the cell of each small cell base station, there are a Physical Cell Identity (PCI) that is a cell division factor in a physical layer and a Global Cell Identity (GCI) that is a unique cell division factor in a mobile communication network. A cell identity is included in the SIB 1 that is broadcasted by the small cell base station 21. In an embodiment of the present invention, if the user equipment 40 detects an accessible small cell base station 21, then the user equipment 40 reports the detected result to the macro base station 20. The macro base station 20, which receives the report for the detection of the small cell base station 21 from the user equipment 40, reads the SIB 1 received from the small cell base station 21 that has been detected by the user equipment 40, commands the user equipment 40 to report a cell identity (PCI or CGI) of the small cell base station 21, and checks whether the corresponding user equipment 40 is accessible to the detected small cell base station 21 on the basis of the cell identity, which is read and identified by the user equipment 40 and the white list. When it is determined that the user equipment 40 is accessible to the detected small cell base station 21, the macro base station 20 may allow the user equipment 40 to perform handover to the corresponding small cell base station 21.

The above-described procedure may be identically applied to a procedure of which the user equipment 40 accesses from the small cell base station 21 to the macro base station 20 or another small cell base station.

Hereinafter, a collective name for the small cell base stations 11 to 15, 21 to 23 and 31 to 33 or/and the macro base stations 10, 20 and 30 will be referred to as a base station apparatus 75.

Figure 2:
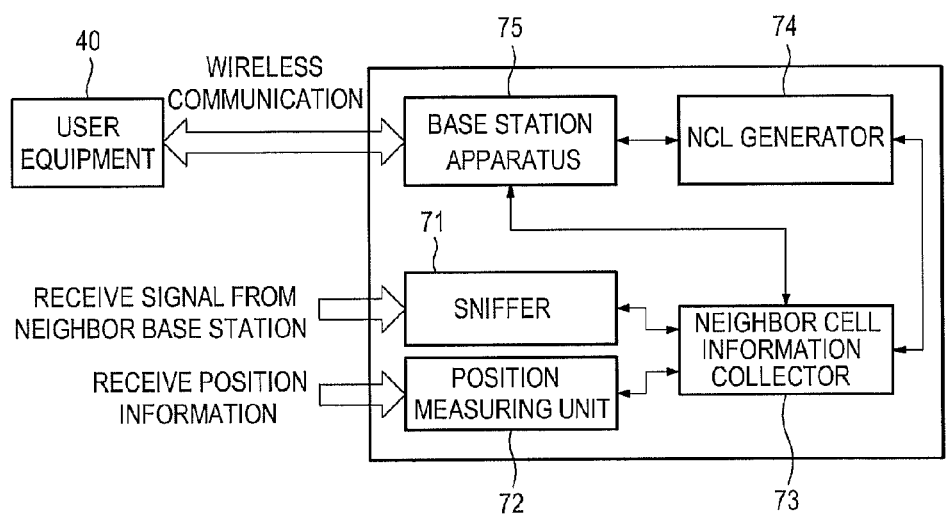
FIG. 2 is a block diagram illustrating an apparatus of automatically configuring a neighbor cell list (NCL) according to the present invention.

FIG. 2 is a block diagram illustrating an illustrative embodiment of an NCL automatic configuration apparatus according to the present invention.

The NCL automatic configuration apparatus may be configured in the base station apparatus 75, or configured separately from the base station apparatus 75.

The NCL automatic configuration apparatus according to the present invention may automatically form an NCL without any additional manipulation of a user in a situation that it may not be known where the base station is installed such as the small cell base stations 11 to 15, 21 to 23 and 31 to 33 (e.g., situation that the user may directly install the base station). This is for ultimately implementing the SON.

In LTE network, the operation of SON for the base station apparatus 75 may be primarily divided into self-configuration and self-optimization. The self-configuration denotes that a network node or a cell is automatically configured as a function of "plug and play." The SON operation includes a function of autonomously recovering network equipment when the network equipment is disabled. Also, the self-optimization is a function that automatically optimizes network performance after the self-configuration and is adaptive to a variable ambient environment. When power is supplied to the base station apparatus 75, the self-configuration operation is performed for automatically configuring a cell, and then the base station apparatus 75 is adapted to a variable ambient environment through the self-optimization operation.

More particularly, the self-configuration operation may include an initialization operation of the base station apparatus 75 for supplying power to the base station apparatus 75 and completing a stand-by state of Radio Frequency (RF) transmission and a setup operation for setting basic information necessary for a system operation by an automatic installation program. The self-optimization is an operation to automatically optimize the network by using a performance measure function of the base station apparatus 75 and the user equipment 40 for adaptation thereof to the environment. In such a case, the self-configuration and self-optimization operations may be supported by the user equipment 40. That is, the user equipment 40 may perform measurements and reporting on the network responsive to a command of the system and transfer the results to the base station apparatus 75, thereby aiding the SON operation.

A configuration operation is a series of operations that are performed for interworking with the currently serving system when the base station apparatus 75 is initially turned on. The configuration operation includes a network interface setup operation, an operation of automatically assigning a physical ID to a cell to be configured, an information exchange operation for forming relations with neighbor cells.

The setup of the network interface is achieved by setting an S1 interface connected to MME 60 at a system center and an X2 interface, which is a network line for direct communication with respective base station apparatuses 75 corresponding to other cells existing in the current system. The S1 interface exchanges signals with MME 60 to thereby transmit and receive Operation and Management (OAM) information for supporting the mobility of the user equipment 40. Also, the X2 interface may play a role of exchanging a signal for quick handover between the base station apparatuses 75, load indicator information, and information for the self-optimization.

A Physical ID (PID) of a cell for a newly installed base station apparatus 75 has a condition that only the PID exists in its cell coverage.

An Automatic Neighbor Relation (ANR) setup, which is an information exchange operation for forming relations with neighbor cells, represents an update operation of the base station apparatus 75 according the configuration of a new cell and the cancellation of a previous cell, and is basically performed by the user equipment 40. The user equipment 40 may transfer a global cell ID (GCI) of a new neighbor cell to the base station apparatus 75, and the base station apparatus 75 may update an NCL and simultaneously configure the X2 interface.

In LTE network, each base station apparatus 75 performs a system optimization operation (i.e., self-optimization). This means that a distribution-type method for providing an optimized service to a provider is used to thereby be actively adapted to an environmental change. The system optimization may be achieved by adjusting coverage of each cell, a service area, a resource distribution, etc by the base station apparatus 75 itself. More particularly, an operation of adjusting power intensity between neighbor base stations may be performed to reduce interference between neighbor cells and power consumption. Also, in order to secure the stable mobility of the user equipment 40, wireless resource management between cells may be performed through the X2 interface that connects the base station apparatuses 75, and an appropriate handover parameter is set according to the environment of each cell. A load distribution operation may be performed for securing the mobility of the user equipment 40 and the stability of a system. The load indicator is exchanged through the X2 interface so that an operation of distributing loads to neighbor cells is implemented.

The NCL automatic configuration apparatus according to an embodiment of the present invention includes the conventional base station apparatus 75 and additionally includes a sniffer 71, a position measurer 72, a neighbor cell information collector 73, and an NCL generator 74.

The sniffer 71, which is an apparatus that a portion of the functions of the user equipment 40 is configured in the base station apparatus 75, receives a wireless signal from a neighbor base station or receives broadcast information from the neighbor base station. That is, in the LTE, cell searching information received by the sniffer 71 is a Received Signal Strength Indication (RSSI)/Signal to Interference and Noise Ratio (SINR) of a downlink reference signal per PCI. In the WCDMA, the cell searching information is a Common Pilot Channel (CPICH) per PCI. In the WiMAX, the cell searching information is an RSSI/SINR for a preamble. NCL information broadcasted by the base station apparatus 75 may commonly correspond to the cell searching information. The cell searching information (a preamble ID/physical cell ID/PN offset, an RSSI/SINR for the same, NCL information broadcasted by a neighbor cell, etc.) measured by the sniffer 71 is transferred to the neighbor cell information collector 73. All of the base station apparatuses 75 broadcast information on its neighbor base stations by considering that the user equipment 40 moves from its coverage to another base station coverage (i.e., handover). Herein, the broadcasted information is the NCL information. For example, in LTE, the NCL is configured with a physical cell ID. If a base station using a physical cell ID "0" broadcasts NCL that physical cell IDs of neighbor base stations thereof are "1 to 10", then the user equipment 40 preferentially searches (cell searching) the physical cell IDs "1 to 10". Alternatively, in the WiMAX, an NCL may be configured with a preamble ID, and in the CDMA, an NCL may be configured with a PN offset.

The position measurer 72 measures a distance to a neighbor base station. if a Global Positioning System (GPS) is used, the position measurer 72 measures only latitude and longitude information, for using map information. That is, the position measurer 72 may measure latitude and longitude information with the GPS, and measure a distance between base stations by using the map data of the base station apparatus 75 or the management server 70 that manages the base station apparatus 75. Since the map data includes the position information of neighbor base stations, if latitude and longitude information can be known, the position measurer 72 may measure a distance between base stations on the basis of the latitude and longitude information. Distance information (distance information from the position of a corresponding base station to a cell neighbor thereto) measured by the position measurer 72 is transferred to the neighbor cell information collector 73.

In another embodiment of the present invention, the base station apparatus 75 may use the user equipment 40 for obtaining neighbor cell information (including cell searching information and distance information). In an embodiment of the present invention, if the base station apparatus 75 commands the user equipment 40 to measure information on the neighbor cells in an operation state, then the user equipment 40 may collect the information on the neighbor cells. As example of the information of the neighbor cells, the base station apparatus 75 commands the user equipment 40 to report preamble ID/physical cell ID/PN offset of the neighbor cell, wireless measurement information on RSSI/SINR for the same, the NCL information broadcasted in the neighbor cell and distance information to the neighbor cell, which is measured by the user equipment having a position tracing function to the base station apparatus 75. Looking into the process in which the base station apparatus 75 makes the user equipment 40 to measure the neighbor cell information to collect the neighbor cell information, when the base station apparatus 75 commands the user equipment 40 to search neighbor cells, the user equipment 40 searches the neighbor cells through cell searching, and informs the base station apparatus 75 of the preamble ID/physical cell ID/PN offset of each of the searched neighbor cells, an RSSI/SINR for the same, and NCL information broadcasted in the searched neighbor cells, and distance information to a neighbor cell. The base station apparatus 75 transfers the neighbor cell information (including cell searching information and distance information), which is reported by the user equipment 40, to the neighbor cell information collector 73.

The distance information to the neighbor cell may be automatically obtained by using an additional element such as a GPS that is mounted on the base station apparatus 75 or issuing a command to the user equipment 40. However, a user manually inputs a home address, etc. directly by using a computer or an input apparatus, thereby acquiring distance information between neighbor cells.

The neighbor cell information collector 73 collects neighbor cell information (including cell searching information and distance information) that is measured by the sniffer 71 and the position measurer 72, or collects neighbor cell information (including cell searching information and distance information), which is measured by the user equipment 40, through the base station apparatus 75. In another embodiment of the present invention, the neighbor cell information collector 73 may be only distance information. When collecting only distance information, the neighbor cell information collector 73 may acquire cell searching information through the management server 70. That is, if the position of a base station can be known and then the position of a neighbor base station through the map data can be known, a preamble ID/physical cell ID/PN offset and NCL information broadcasted by the neighbor base station may be known. The preamble ID/physical cell ID/PN offset and NCL information are information that is stored in a database of the management server 70.

The neighbor cell information collected by the neighbor cell information collector 73 is delivered to the NCL generator 74, which generates a suitable NCL on the basis of the neighbor cell information (including cell searching information and distance information) that is delivered from the neighbor cell information collector 73. The NCL generator 74 operates based on the preamble ID/physical cell ID/PN offset of each of neighbor cells, and calculates the weighting of the preamble ID/physical cell ID/PN offset of each neighbor cell on the basis of the wireless measurement information of the cell searching information, in which case the NCL generator 74 calculates the weighting of an NCL of a neighbor cell when there is the NCL information of the neighbor cell. When there is no wireless measurement information, the same weighting is assigned for the preamble ID/physical cell ID/PN offset of all the neighbor cells. The NCL generator 74 calculates weightings by preamble ID/physical cell ID/PN offset, calculates the sum of the weightings, calculates an average weighting sum, and adds the weightings into the NCL of a base station in a descending order of weightings. The NCL generated by the NCL generator 74 is broadcasted to the user equipment 40 through the base station apparatus 75. An operation of configuring an NCL will now be described in detail.

The NCL generator 74 acquires the preamble ID/physical cell ID/PN offset and NCL information (NCL broadcasted by a neighbor base station) of the neighbor base station and, by performing the following stages, configures an NCL thereof.

Determining Weightings of Neighbor Base Stations (First Step)

The weightings of neighbor base stations are determined as expressed in Equation (1) below:

$$\text{Cell\_Weighting} = 100 \times \frac{M_i}{\sum M_j} \quad (1)$$

where Cell_Weighting, denotes a weighting of the preamble ID/physical cell ID/PN Offset of a neighbor cell "i", and $M_i$ denotes a value that is measured from the neighbor cell "i". Also, $\sum M_j$ denotes the sum of from $M_0$ to $M_2$ when $M_i$ is calculated with a measured distance or an SINR of a $j^{th}$ neighbor base station and total three neighbor base stations are searched. For example, when an SINR is measured, $M_i$ becomes $10_i^{SINR/10}$, but when a distance is measured, $M_i$ becomes $1/d_i$. Herein, $d_i$ indicates a distance between a corresponding cell and a neighbor cell.

As described above, in determining the weightings of neighbor base stations, it can be seen that wireless measurement information (RSSI/SINR) or distance information is selectively used. Therefore, the neighbor cell information collector 73 collects cell searching information or/and distance information from at least one of the base station apparatus 75, sniffer 71, and position measurer 72.

Determining Weightings of NCLs of Neighbor Base Stations (Second Step)

The weighting of an NCL of a measured neighbor base station is determined as expressed in Equation (2):

$$\text{NCL\_Weighting}_i = \alpha_i \times \text{Cell\_Weighting}_i \quad (2)$$

where $\alpha_i$ indicates the ratio (ratio of a weighting and an NCL weighting of a detected cell) of Cell_Weighting$_i$ (which has been calculated in the first step) and NCL_Weighting$_i$, and has a value of 0 to 1. Particularly, when $\alpha_i$=0, this is a case where an NCL of a neighbor base station is not used.

Calculating Sum of Weightings by Preamble ID/Physical Cell ID/PN Offset (Third Step)

A weighting sum "Weight_Sum" is calculated for the preamble ID/physical cell ID/PN Offset that has been calculated in each of the first and second steps.

Calculating Average Preamble ID/Physical Cell ID/PN Offset Weighting (Fourth Step)

An average weighting sum is calculated for the weighting sum "Weight_Sum" that has been calculated in the third step, by using Equation (3) below. This operation optimizes an NCL using a filter, according to a result that is obtained by iteratively performing an automatically generated NCL:

$$\text{AvgWeight\_Sum}(i)=(1-\beta)\times\text{AvgWeight\_Sum}(i-1)+\beta\times\text{Weight\_Sum}(i) \quad (3)$$

where β is a filter coefficient (i.e., a parameter for calculating an average of weighting sums) of an equation for calculating the average weighting sum, AvgWeight_Sum(0) is set as the sum "Weight_Sum" of preamble ID/physical cell ID/PN Offset weightings that have been first calculated, and each of AvgWeight_Sum(1), AvgWeight_Sum(2), . . . , AvgWeight_Sum(i) denotes the sum "Weight_Sum" of average weightings that are newly calculated. The base station apparatus 75 calculates an average AvgWeight_Sum with Weight_Sum(i), and registers the calculated AvgWeight_Sum in an NCL thereof in descending order of weightings.

Such an operation may be used to generate an intra-frequency NCL, an inter-frequency NCL, and an inter-RAT NCL.

Figure 4:
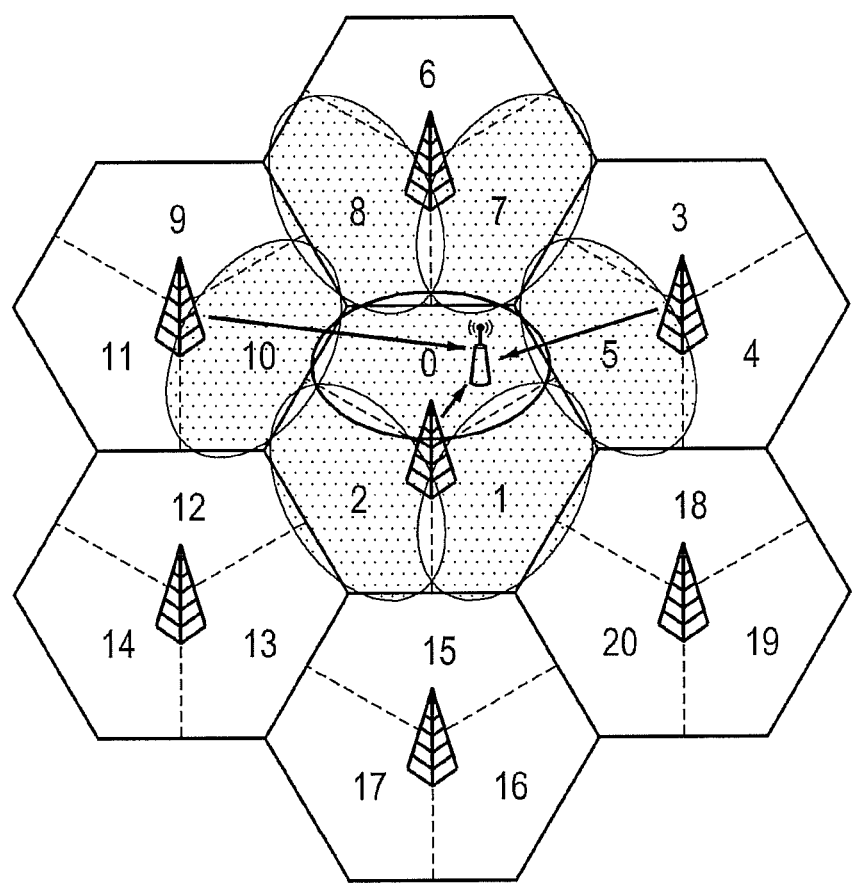
FIG. 4 is a schematic diagram illustrating an NCL of a base station which has been configured according to an embodiment of the present invention.

As an example for NCL generation, when the physical cell ID of the base station (which has been measured in the first step) is 0, 5, and 10 and $M_i$ corresponding thereto is 25, 15, and 10, Cell_Weighting$_0$ is 50, Cell_Weighting$_5$ is 30, and Cell_Weighting$_{10}$ is 20. When $\alpha_0=\alpha_5=\alpha_{10}=0.5$, as illustrated in FIG. 3, the sum of weightings may be calculated. Subsequently, the base station apparatus 75 registers the calculated weighting sums in an NCL thereof in descending order of weighting sums, and broadcasts the weighting sums. In the present example, it is determined that the weighting of "physical cell ID=0" is the highest as 75, and successively the weighting of "physical cell ID=5" is the second highest. In FIG. 4, the number of neighbor cells is assumed as seven. As exemplified, according to the present embodiment, it can be seen that a neighbor base station is set as an NCL.

In the present disclosure, the following simulation environment is provided.

NumOfCells=57, NCL Length=18, ISD=1732 m, Shadowing standard deviation=8 dB, Noise Figure=9 dB, Noise Density=−174 dBm/Hz, Wall loss=20 dB An $SINR_i$ of an ith cell may be calculated as expressed in Equation (4):

$$SINR_i = \frac{RxPower_i}{LoadFactor \times \sum_{j=0, j \neq i}^{NumOjCell} RxPower_j + N} \quad (4)$$

where $RxPower_i$ is reception power for the ith cell, N is white noise, and LoadFactor is a value that indicates a degree of loading (a degree of interference) of a neighbor cell. That is, LoadFactor denotes the amount of interference that is caused from the neighbor cell. When LoadFactor is 0, this is a case where interference is not caused from the neighbor cell at all. When LoadFactor is 1, this is a case where the downlink wireless resource of the neighbor cell is all used and thus interference is severe.

Under such an environment, a cell has been additionally added in an arbitrary, the SINR of a neighbor cell has been measured, an NCL of the neighbor cell has been acquired, an NCL of the added cell has been generated, and handover performance has been measured. The NCL outage of FIG. 5 denotes a case where when user equipment 40 in the added cell intends to perform handover to the existing cell, the user equipment 40 receives an NCL from the added cell, but cannot perform handover to a cell included in the received NCL. That is, the NCL outage denotes a case where when the user equipment 40 intends to perform handover to another cell, the user equipment 40 cannot perform handover to an NCL provided from the base station apparatus 75. For example, when the NCL of the added cell is 0, 1, 2, 5, 7, 8, and 10 but a cell measured for handover of the user equipment 40 is 3, 4, and 18, this corresponds to the NCL outage. To test the effects of the present disclosure, the following two methods have been simulated.

First method (optimal method): setting an NCL to include a cell, neighboring to a newly installed cell, up to 2 tiers Second method (comparison method): setting only a preamble ID/physical cell ID/PN offset, which is receivable by a newly installed cell, as an NCL (in FIG. 3, the NCL is set as 0, 5, and 10)

Third method (the present disclosure): setting the NCL that has been generated by the first to fourth steps of the present disclosure, by using a preamble ID/physical cell ID/PN offset receivable by a newly installed cell and an NCL of a neighbor (in FIG. 3, in addition to 0, 5, and 10, an NCL thereof is also set as an NCL according to a weight)

Figure 5:
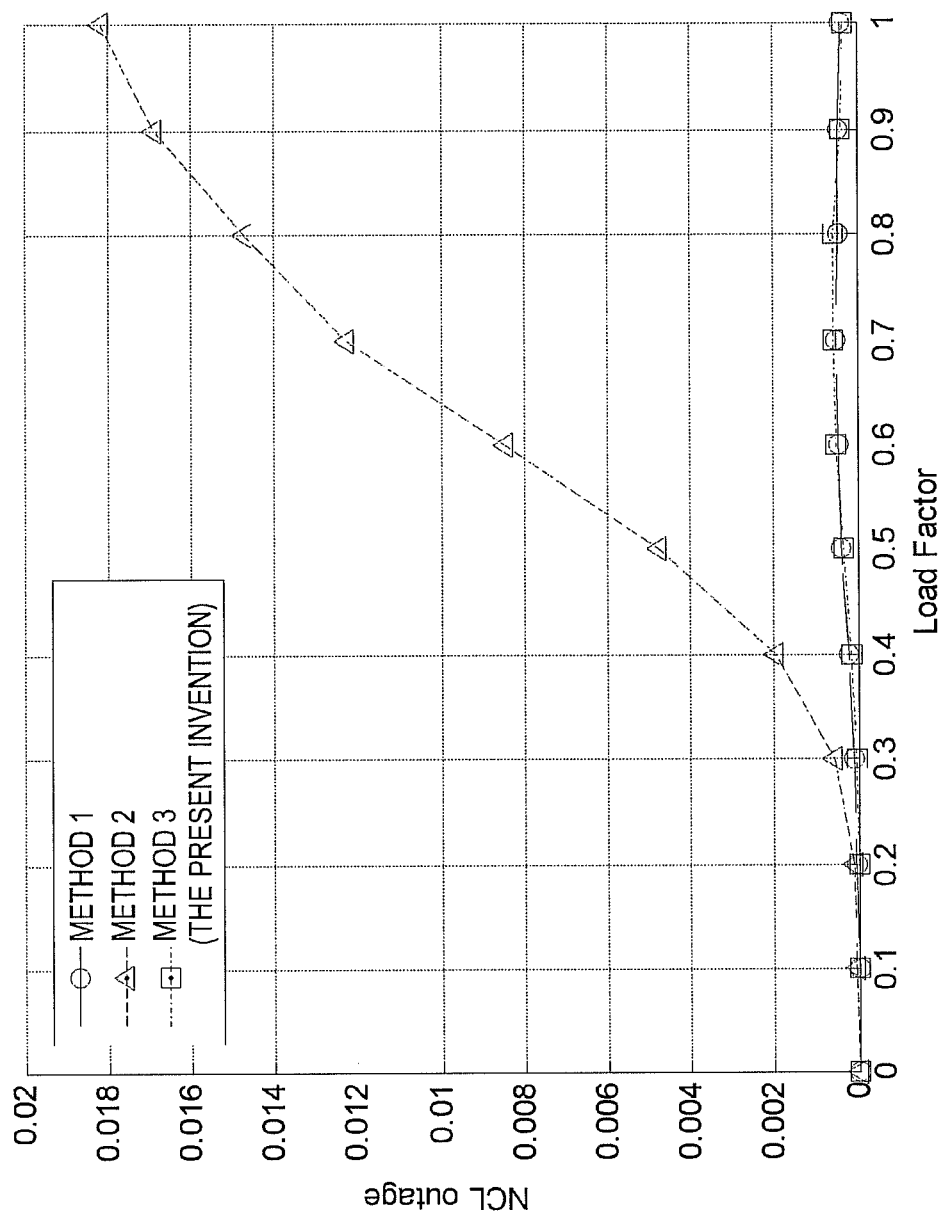
FIG. 5 is a graph for the performance comparison of an NCL configured according to an embodiment of the present invention.

The first method may be the optimal method because including a neighbor cell up to 2 tiers. The second method is a special case, and denotes a case where $\alpha_i=0$. Herein, "$\alpha_i=0$" is a case where an NCL of a neighbor cell is not used. The third method, as a method the present disclosure desires, is a method that searches neighbor cells and sets an NCL of a newly installed cell by using the preamble ID/physical cell ID/PN offset and NCL information of the neighbor cell. The comparison of performances for the three methods is as shown in FIG. 5. In the first method, NCL outage performance does not exceed 0.1%, and in the second method, NCL outage performance approximates to 2%. When an NCL is generated by the method of the present disclosure, a performance curve similar to that of the first method (being the optimal method) is obtained.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A Neighbor Cell List (NCL) automatic configuration apparatus, comprising:
   a neighbor cell information collector configured to collect at least one of neighbor cell information including cell searching information necessary for a handover of a user equipment to a neighbor cell and distance information between a corresponding base station and the neighbor cell; and
   an NCL generator configured to calculate weightings of neighbor base stations, calculate sum of the weightings and configure the NCL with the base stations having higher weightings, on the basis of at least one neighbor cell information.

2. The NCL automatic configuration apparatus of claim 1, wherein the cell searching information comprises: a preamble ID, physical cell ID, or PN offset of each of a plurality of neighbor cells; wireless measurement information regarding a Received Signal Strength Indication (RSSI) or Signal to Interference and Noise Ratio (SINR) thereof; and NCL information broadcasted by each neighbor cell.

3. The NCL automatic configuration apparatus of claim 2, wherein the at least one neighbor cell information is a value which is measured and notified by the user equipment which is commanded to search a plurality of neighbor cells.

4. The NCL automatic configuration apparatus of claim 1, wherein the distance information is a value which is measured on the basis of map data of a base station management server, and the map data comprises latitude information and longitude information which have been calculated by a Global Positioning System (GPS).

5. The NCL automatic configuration apparatus of claim 1, further comprising:
   a position measurer configured to measure a distance to a neighbor base station and provide the distance information; and
   a sniffer configured to receive a signal from the neighbor base station to provide the cell searching information.

6. The NCL automatic configuration apparatus of claim 1, wherein the NCL is any one of: an intra-frequency NCL where a plurality of neighbor cells use the same frequency; an inter-frequency NCL where a plurality of neighbor cells use different frequencies; and an inter-RAT NCL where a plurality of neighbor cells are respectively based on different communication protocols.

7. The NCL automatic configuration apparatus of claim 6, wherein the NCL generator operates based on a preamble ID, physical cell ID, or PN offset of each of a plurality of neighbor cells, and calculates a weighting of the preamble ID, physical cell ID, or PN offset of each neighbor cell based on wireless measurement information of the cell searching information, calculates a weighting of an NCL of the neighbor cell in case that NCL information exist, and assigns same weightings for the preamble IDs, physical cell IDs, or PN offsets of all the neighbor cells in case that NCL information does not exist.

8. The NCL automatic configuration apparatus of claim 7, wherein the NCL generator calculates weightings by preamble ID, physical cell ID, or PN offset, calculates sum of the weightings, calculates an average weighting sum, and adds the weightings into an NCL of a base station in descending order of weightings.

9. The NCL automatic configuration apparatus of claim 8, wherein the preamble ID, physical cell ID, or PN offset of the NCL is set not to be overlapped.

10. A mobile communication system, comprising:
   the Neighbor Cell List (NCL) automatic configuration apparatus of claim 1,
   wherein a base station apparatus broadcasts an NCL which is configured by the NCL automatic configuration apparatus, for neighbor cell searching of user equipment.

11. A Neighbor Cell List (NCL) automatic configuration method, comprising:
   collecting at least one of neighbor cell information including cell searching information necessary for a handover of a user equipment to a neighbor cell and distance information between a corresponding base station and the neighbor cell; and
   calculating weightings of base stations, calculating sum of the weightings, and configuring the NCL with the base stations having higher weightings, on the basis of at least one neighbor cell information.

12. The NCL automatic configuration method of claim 11, wherein the cell searching information comprises: a preamble ID, physical cell ID, or PN offset of each of a plurality of neighbor cells; wireless measurement information regarding a Received Signal Strength Indication (RSSI) or Signal to Interference and Noise Ratio (SINR) thereof; and NCL information broadcasted by each neighbor cell.

13. The NCL automatic configuration method of claim 12, wherein the at least one neighbor cell information is a value which is measured and notified by the user equipment which is commanded to search a plurality of neighbor cells.

14. The NCL automatic configuration method of claim 11, wherein the distance information is a value which is measured on the basis of map data of a base station management server, and the map data comprises latitude information and longitude information which have been calculated by a Global Positioning System (GPS).

15. The NCL automatic configuration method of claim 14, wherein,
   a position measurer measures a distance to a neighbor base station to provide the distance information, and
   a sniffer receives a signal from a neighbor base station to provide the cell searching information.

16. The NCL automatic configuration method of claim 11, wherein the NCL is any one of: an intra-frequency NCL where a plurality of neighbor cells use the same frequency; an inter-frequency NCL where a plurality of neighbor cells use different frequencies; and an inter-RAT NCL where a plurality of neighbor cells are respectively based on different communication protocols.

17. The NCL automatic configuration method of claim 16, wherein the calculating of weightings comprises:
   determining weightings of a plurality of neighbor base stations;
   determining NCL weightings of the neighbor base stations;
   calculating sum of the weightings;
   calculating average weightings for the weighting sum; and
   registering the average weightings in the NCL in descending order of average weightings.

* * * * *